US012606045B2

(12) United States Patent (10) Patent No.: US 12,606,045 B2

McLachlan et al. (45) Date of Patent: Apr. 21, 2026

(54) BATTERY STATE OF CHARGE CONTROL USING MACHINE LEARNING

(71) Applicant: Rivian IP Holdings, LLC, Irvine, CA (US)

(72) Inventors: Paul McLachlan, Bellevue, WA (US); Weiyang Sun, Frisco, TX (US)

(73) Assignee: Rivian IP Holdings, LLC, Irvine, CA (US)

( * ) Notice: Subject to any disclaimer, the term of this patent is extended or adjusted under 35 U.S.C. 154(b) by 960 days.

(21) Appl. No.: 17/733,375

(22) Filed: Apr. 29, 2022

(65) Prior Publication Data

US 2023/0347776 A1 Nov. 2, 2023

(51) Int. Cl.
B60L 53/66 (2019.01)
B60L 3/12 (2006.01)
(Continued)

(52) U.S. Cl.
CPC .............. B60L 53/66 (2019.02); B60L 3/12 (2013.01); B60L 53/305 (2019.02); B60L 58/10 (2019.02); B60L 58/13 (2019.02); B60L 58/16 (2019.02); G06N 20/00 (2019.01); H02J 7/0071 (2020.01); B60L 58/12 (2019.02); B60L 2260/20 (2013.01); B60L 2260/46 (2013.01); B60L 2260/54 (2013.01); G06F 3/048 (2013.01); G06F 3/04847 (2013.01); Y02T 10/70 (2013.01)

(58) Field of Classification Search
CPC .......... B60L 53/66; B60L 3/12; B60L 53/305; B60L 58/10; B60L 58/13; B60L 58/16; B60L 58/12; B60L 2260/20; B60L 2260/46; B60L 2260/54; G06N 20/00; H02J 7/0071; G06F 3/048; G06F 3/04847; Y02T 10/70
USPC ......................................................... 320/134
See application file for complete search history.

(56) References Cited

U.S. PATENT DOCUMENTS

2012/0256588 A1* 10/2012 Hayashi ................... B60L 3/12
320/109
2017/0267116 A1* 9/2017 Lindemann ............. B60L 53/66
(Continued)

FOREIGN PATENT DOCUMENTS

CN 104827922 A 8/2015
CN 105383422 A 3/2016
(Continued)

OTHER PUBLICATIONS

Chinese Office Action and Search Report on Appl. No. CN202211602830.2 dated Feb. 2, 2026.

*Primary Examiner* — Julian D Huffman
*Assistant Examiner* — Nathan J Instone
(74) *Attorney, Agent, or Firm* — Foley & Lardner LLP

(57) ABSTRACT

Controlling a battery state of charge using machine learning is provided. A system of an electric vehicle identifies data including a state of charge of a battery of the electric vehicle, a state of health of the battery of the electric vehicle, and a drive mode of the electric vehicle. The system establishes, based on input of the data into a local model configured on the electric vehicle and trained with machine learning, a schedule to control charging of the battery of the electric vehicle. The system executes, responsive to a power source electrically coupled to the battery of the electric vehicle, the schedule to control an amount of current supplied from the power source to the battery of the electric vehicle.

18 Claims, 10 Drawing Sheets

(51) Int. Cl.

| | | |
|---|---|---|
| *B60L 53/30* | (2019.01) | |
| *B60L 58/10* | (2019.01) | |
| *B60L 58/12* | (2019.01) | |
| *B60L 58/13* | (2019.01) | |
| *B60L 58/16* | (2019.01) | |
| *G06F 3/048* | (2013.01) | |
| *G06F 3/04847* | (2022.01) | |
| *G06N 20/00* | (2019.01) | |
| *H02J 7/00* | (2006.01) | |

(56) References Cited

U.S. PATENT DOCUMENTS

| | | | | |
|---|---|---|---|---|
| 2020/0269719 A1* | 8/2020 | Aykol | .................... | B60L 53/30 |
| 2021/0203177 A1* | 7/2021 | Peng | ...................... | B60L 53/63 |
| 2021/0218073 A1* | 7/2021 | Duan | ..................... | B60L 53/66 |
| 2022/0103004 A1* | 3/2022 | Patel | ..................... | B60L 53/10 |
| 2022/0179009 A1* | 6/2022 | Simonis | ............... | G01R 31/367 |
| 2022/0305941 A1* | 9/2022 | Telpaz | ................. | H02J 7/0048 |
| 2023/0141525 A1* | 5/2023 | Eitzer | ................ | H01M 10/482 |
| | | | | 320/109 |

FOREIGN PATENT DOCUMENTS

| | | | |
|---|---|---|---|
| CN | 113561819 | A | 10/2021 |
| CN | 114156974 | A | 3/2022 |
| KR | 101509965 | B1 | 4/2015 |
| KR | 20210148759 | A | 12/2021 |

* cited by examiner

200

Identify data — 205

Provide the data to a local model — 210

Generate a charge schedule — 215

Facilitate charging in accordance with the charge schedule — 220

300

700

BATTERY STATE OF CHARGE CONTROL USING MACHINE LEARNING

INTRODUCTION

An electric vehicle can include a battery that supplies power to an electric motor of the electric vehicle. Power can be supplied to the electric battery using a commercial or residential charger, and the battery can have various states of charge.

SUMMARY

This disclosure is generally directed to improving the state of health of a battery by controlling charging of the battery using machine learning. For example, an electric vehicle can have a model that is trained with machine learning using driver behavior patterns or driver preferences. The electric vehicle can use the model to establish a customized charging schedule for the electric vehicle. The schedule can be used to increase the useful life of the battery. For example, the battery life can be improved if the battery state of charge ("SoC") is maintained between a range of 20% to 80%. The charging schedule can allow for the battery to remain within this range during certain time periods, such as periods of low use, or overnight.

At least one aspect is directed to a system. The system can include a data processing system including one or more processors, couple to memory. The data processing system can identify data comprising a state of charge of a battery of the electric vehicle, a state of health of the battery of the electric vehicle, and a drive mode of the electric vehicle. The data processing system can generate a charge schedule. The data processing system can generate the charge schedule based on input of the data into a model trained with machine learning. The charge schedule can charge the battery of the electric vehicle. The charge schedule can control charging of the battery so that an amount of current from a power source varies over time. The data processing system can facilitate charging of the battery of the electric vehicle in accordance with the charge schedule. The data processing system can facilitate charging of the battery of the electric vehicle responsive to a power source electrically coupled to the battery of the electric vehicle.

At least one aspect is directed to a method. The method can include identifying, by a data processing system comprising one or more processors and memory, data comprising a state of charge of a battery of an electric vehicle, a state of health of the battery of the electric vehicle, and a drive mode of the electric vehicle. The method can include the data processing system generating, based on input of the data into a model trained with machine learning, a charge schedule to charge the battery of the electric vehicle. The charge schedule can control charging of the battery so that an amount of current from a power source varies over time. The method can include the data processing system facilitating, responsive to a power source electrically coupled to the battery of the electric vehicle, charging of the battery of the electric vehicle in accordance with the charge schedule.

At least one aspect is directed to an electric vehicle. The electric vehicle can include a battery, a sensor, or one or more processors in communication for the sensor and the battery include one or more processors in communication with the sensor and the battery. The one or more processors can identify data comprising a state of charge of the battery, a state of health of the battery, and a drive more of the electric vehicle. The one or more processors can generate, based on input of the data into a model trained with machine learning, a charge schedule to charge the battery of the electric vehicle. The charge schedule can control charging of the battery so that an amount of current from a power source varies over time. The one or more processors can facilitate, responsive to a power source electrically coupled to the battery of the electric vehicle, charging of the battery of the electric vehicle in accordance with the charge schedule.

At least one aspect is directed to a system. The system can include a server, a network and a data processing system of an electric vehicle. The server can receive, from the data processing system of the electric vehicle, one or more weights generated for a model. The server can update a regional model using the weights generated for the model. The server can generate one or more weights for the regional model. The server can provide the weights generated for the regional model to one or more electric vehicles.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
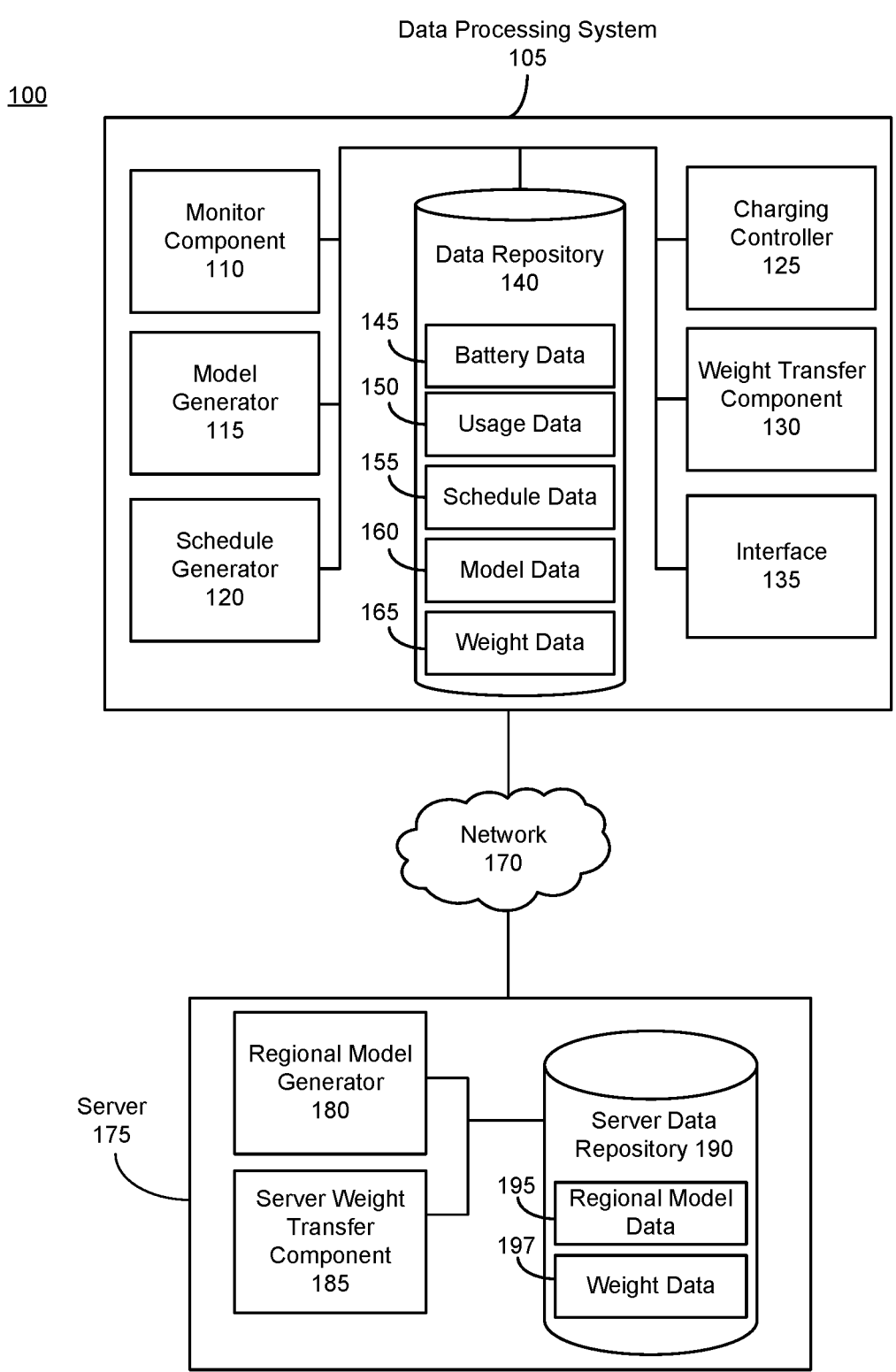
FIG. 1 depicts an example system to control state of charge of an electric vehicle battery using machine learning, in accordance with an implementation.

Following below are more detailed descriptions of various concepts related to, and implementations of, methods, apparatuses, and systems of controlling state of charge of an electric vehicle battery using machine learning. The various concepts introduced above and discussed in greater detail below may be implemented in any of numerous ways.

This disclosure is directed to systems and methods of controlling the state of charge of an electric vehicle battery using machine learning. This technical solution can use a model trained with machine learning to generate a schedule, and use the schedule to control the state of charge (SoC) of the electric vehicle battery. The machine learning model can be trained to generate a schedule that improves or maximizes the state of health ("SoH") of the battery. The technical solution can leverage a regional model to update a local model. The local model can be or include a model that is used to optimize the SoH of the battery for an electric vehicle. The regional model can be or include a model that is used to optimize the SoH of the batteries for one or more electric vehicles. The regional model can be remote from the electric vehicles. The regional model can generate weights. The weights can be provided to the local model. The local model can be updated by applying the weights, generated for the regional model, to the local model. The regional model can generate the weights by using regional data. The regional data can include weather data or traffic data for a geographic region. The regional data can be current occurrences or predictions associated with electric vehicles having a similar configuration and operating characteristics as the current vehicle The local model can optimize the SoH of the battery by determining behavior patterns of the driver. The behavior patterns can include a charging pattern or a vehicle utilization pattern. For example, the charging pattern can be determined by a frequency of charging. The frequency of charging can be the number of times the battery is charged in a predetermined amount of time. The local model can use the charging pattern to establish a schedule that can optimize the SoH of the battery. The local model can use the charging pattern to determine a low use time period for the vehicle. The schedule can optimize the SoH of the battery by maintaining the battery in a sub-charge state during the low use time period.

The vehicle utilization behavior can be determined by energy consumption, route history, vehicle settings or duration of utilization. The energy consumption can be or include the amount of charge used in a predetermined amount of time. The route history can include at least one of a route taken, distance traveled or a recurrence of the route. The vehicle settings can include at least one of a drive mode setting or vehicle temperature setting. The duration of utilization can include how long the vehicle is utilized in a predetermined amount of time. The local model can use the vehicle utilization behavior to establish a schedule that can optimize the SoH of the battery. The local model can use the vehicle utilization to determine an expected vehicle usage. The expected vehicle usage can include an expected energy consumption amount. The expected energy consumption amount can be less than a predetermined SoC metric. The schedule can optimize the SoH of the battery by preventing the SoC from reaching the predetermined SoC metric when the expected energy consumption amount is less than the predetermined SoC metric.

The local model can optimize the SoH of the battery by using a driver preference. For example, the driver can provide a preference that the battery be at maximal charge at a certain time. The local model can use the preference that the battery be at maximal charge to establish a schedule that can result in a SoC of 100% being reached by the expected driving time. The schedule can involve multiple charging cycles. The battery can be charged until a SoC threshold is reached. Once the SoC threshold is reached a pre-conditioning charging cycle can then be followed. The pre-conditioning cycle can be followed until a predetermined time is reached. Once the predetermined time is reached the battery can be charged so that maximal or predetermined SoC can be reached by the expected driving time. The schedule can optimize the SoH of the battery by limiting the amount of time the battery is at maximal SoC prior to the expected driving time.

The regional model can optimize the SoH of the battery by providing weights, generated for the regional model, to the local model. The weights can be used to update the local model. For example, the regional model can generate weights that can include traffic conditions for a region that includes a local model. The weights can be provided to the local model. The local model can be updated by applying the weights, generated for the regional model, to the local model. For example, the updated local model can use the weights generated for the regional model to predict driving behavior, electric vehicle utilization, or battery utilization with improved accuracy, reliability, or efficiency. Using the updated local model, the data processing system can generate an updated schedule for charging the battery based on the predicted or forecasting driving patterns, driving behavior, or other factors that lead to battery utilization. For example, the data processing system can predict, using the updated local model, that the travel time from a start destination to an end destination may have decreased relative to a prior travel time due to improved weather conditions (e.g., no rain or snow on the route) or reduced traffic (e.g., fewer vehicles on the road). The data processing system can determine that the decrease in travel time can result in less energy consumption. The updated local model can, using the decrease in travel time, update the expected energy consumption amount. The updated local model can, using the updated energy consumption amount, establish a schedule. The schedule can optimize the SoH of the battery by adjusting the SoC that can be reached by an expected driving time. By controlling the SoC to satisfy predicted battery utilization using the model, the data processing system can keep the SoC within a desired range (e.g., 20%-80%) for a greater amount of time relative to not controlling the SoC using a schedule generated via machine learning, thereby improving the SoH of the battery. Thus, optimizing the SoH can refer to or include improving the SoH of the battery relative to charging schedules not generated or updated via machine learning, and the optimized SoH of the battery can result in a longer remaining useful life of the battery. A battery with a better SoH or remaining useful life can allow the electric vehicle to travel a greater distance on a single charge, or allow the electric vehicle to use the same battery for a longer time.

One or more weights can be generated for the local model. The weights, generated for the local model, can be provided to the regional model remote from the electric vehicle. The regional model can be updated by applying the weights, generated for the local model, to the regional model. One or more weights can be generated for the regional model. The regional model can optimize the SoH of the batteries for the electric vehicles by updating one or more local models. The regional model can update the local models by providing the weights, generated for the regional model to one or more electric vehicles. The local models can be updated by applying the weights, generated for the regional model, to the local models.

FIG. 1 depicts an example system 100 to control state of charge of an electric vehicle battery using machine learning, in accordance with an implementation. The data processing system 105 can include at least one monitor component 110 that can identify information or values associated with an electric vehicle. The data processing system 105 can include at least one model generator 115 that can generate, update, maintain, use, or otherwise access a model stored in memory or storage of the data processing system 105. The data processing system 105 can include at least one schedule generator 120 that can generate, modify, update, retrieve or otherwise establish a schedule that can be used to control charging of a battery. The data processing system 105 can include at least one charging controller 125 that can execute the schedule established by the schedule generator 120. The data processing system 105 can include at least one weight transfer component 130 that can provide one or more weights, generated by to the model generator 115, to the regional model. The data processing system 105 can include at least one interface 135 that can present the schedule, generated by the schedule generator 120, to a user. The data processing system 105 can include at least one data repository 140. The data repository 140 can include, store, maintain or otherwise provide battery data 145, such as the SoC of the battery, the SoH of the battery, or energy consumption of the battery. The data repository 140 can include, store, maintain or otherwise provide usage data 150, such as the drive mode, a frequency of charging the battery or a frequency of using the vehicle. The data repository 140 can include, store, maintain or otherwise provide schedule data 155, such as the schedules generated by the schedule generator 120. The data repository 140 can include, store, maintain or otherwise provide model data 160, which can include the local model. The data repository 140 can include, store, maintain or otherwise provide weight data 165, which can include the weights generated for the model or the weights generated for the regional model.

The system 100 can include, interface with, communicate with, or otherwise access one or more servers 175. The server 175 can include at least one regional model generator 180. The server 175 can include at least one server weight transfer component 185 that can provide one or more weights, generated for the regional model, to the local models. The server 175 can include at least one server data repository 190. The server data repository 190 can include, store, maintain, or otherwise provide regional model data 195, such as the regional model. The server data repository 190 can include, store, maintain or otherwise provide weight data 197, such as the weights generated for the regional model and the local model. The data processing system 105 and the server 175 can interact by using the network 170.

The regional model data 195 of the server 175 can refer to a model that is generated or established for a multiple electric vehicles. The regional model can be generated for a number of vehicles that have a characteristic or attribute in common, such as a geographic region, driving pattern, driving behavior, operating conditions (e.g., weather or climate in which the electric vehicle operates). For example, the regional model can be generated for electric vehicles that operate or drive in a same geographic region (e.g., city, county, zip code, state, or region of a country). The model data 160 of the data processing system 105 can refer to or include a local model or a customized model that is generated for a particular electric vehicle 905 or user thereof (e.g., local model associated with a driver or user of the electric vehicle 905 having a unique identifier or username, or a local model associated with a household). The model (or local model or customized model) can be generated by the data processing system 105 of the electric vehicle (e.g., electric vehicle 905 depicted in FIG. 9), or by the server 175. The local model can be a portable, cloud-based model maintained on a server 175. For example, the server 175 can include one or more component or functionality of the data processing system 105, such as the model generator 115, to generate the model or model data 160 on the server 175. The server 175 can transmit or otherwise provide the model to the data processing system 105 to cause the data processing system 105 of the electric vehicle to generate the charge schedule. For example, when the driver of user enters the electric vehicle 905 or logs into the electric vehicle 905, the data processing system 105 can download the local model for the user from the server 175. The local model can be a portable model that can be used by the same user or driver on multiple electric vehicles, for example. The server 175 can generate the customized model and provide it to the data processing system 105 for storage and use on the data processing system 105 of the electric vehicle. In some cases, the server 175 can generate the customized charge schedule for the electric vehicle 905 and transmit the customized charge schedule to the data processing system 105 for use in facilitating charging of the battery of the electric vehicle or otherwise executing the schedule. For example, the data processing system 105 can request the customized charge schedule from the server 175 responsive to the user or driving entering the electric vehicle 905 or signing into the data processing system 105 using a unique identifier or other authentication credentials. Thus, the data processing system 105 can generate the model locally on the data processing system 105 or the electric vehicle 905; the server 175 can generate the model and provide the model for local storage on the data processing system 105 or the vehicle 905 to allow the data processing system 105 to generate the customized charge schedule for the electric vehicle; or the server 175 can generate the model and the customized charge schedule for the electric vehicle 905 and transmit the customized charge schedule to the data processing system 105 to allow the data processing system 105 to execute the customized charge schedule or otherwise facilitate charging the battery in accordance with the customized charge schedule.

The monitor component 110 can include one or more sensors. The sensors can collect data. The sensors can include at least one of a temperature sensor, a drive mode sensor, a battery cell sensor, a location sensor, a weather sensor, a power source sensor, a user sensor or a duration sensor. The temperature sensor can collect data that can be used to determine a temperature of one or more locations. For example, the temperature sensor can be located proximate to the battery of the electric vehicle (e.g., proximate to battery pack 910 of electric vehicle 905) and can detect, sense or measure a temperature of the battery. In some cases, the temperature sensor can be located on an external portion of the electric vehicle and can sense, detect, or measure the temperature of an environment outside or external to the electric vehicle. In some cases, a temperature sensor can be located within the cabin of the vehicle. The temperature sensor data can be used to determine the temperature of the vehicle's cabin.

The monitor component 110 can include or interface with a drive mode sensor. The drive mode sensor can collect data that can be used to determine a drive mode of the vehicle. For example, the drive mode sensor can be a tactile sensor. The drive mode sensor can detect a driver selecting a drive mode within the interface 135. The drive mode sensor can communicate or interface with an onboard computer of the electric vehicle that manages the drive mode of the vehicle. The monitor component 110 can determine or identify drive modes such as a sports mode, economy mode, comfort mode, off-road mode, all-wheel drive mode, or track mode, for example.

The monitor component 110 can include, communicate with or otherwise interface with a battery cell sensor. The battery cell sensor can collect data that can be used to determine the SoC of the battery, the SoH of the battery or energy consumption. For example, the battery cell sensor can include a voltage sensor or current sensor. The battery cell sensor can be used to determine a voltage. The monitor component 110 can determine the SoC of a battery based on monitoring voltage, amperage, or ampere hours remaining of the battery. For example, the monitor component 110 can determine the voltage or current output of the battery and compare the measurements with a predetermined graph for the battery to determine a state of charge of the battery. In some cases, the monitor component 110 can determine the state of charge of the battery as a percentage that is a function of the terminal voltage of the battery.

The location sensor can collect data that can be used to determine a location of the vehicle. For example, the location sensor can be a global positioning sensor ("GPS") sensor. The location sensor can collect data that can be used to determine a distance traveled by the vehicle. The weather sensor can collect data that can be used to determine the weather. For example, the weather sensor can be positioned on the outside of the vehicle. The weather sensor data can be used to determine the temperature outside of the vehicle. The monitor component 110 can determine the weather by communicating, via the network 170, with a weather database or server that can provide weather information. The weather information can include the current weather, historical weather information, or weather forecasts for one or more geographic regions. The weather information can be for a current location of a vehicle, or along a route to be traversed by the vehicle during an upcoming trip.

The power source sensor can collect data that can be used to determine that the vehicle is coupled to a power source. The user sensor can collect data that can be used to determine data associated with the user. The duration sensor can collect data that can be used to determine a duration of utilization. The duration of utilization can include at least one of an amount of time the vehicle is used, an amount of time spent in a drive mode or an amount of time spent charging.

The monitor component 110 can identify the data collected by the sensors as the battery data 145 or the usage data 150. For example, the monitor component 110 can identify the data collected by the sensors as the battery data 145 when the data collected by the sensors includes SoC data, SoH data or energy consumption data. The monitor component 110 can identify the data collected by the sensors as the usage data 150 when the data collected by the sensors includes drive mode data, charging data or vehicle use data.

The monitor component 110 can provide the data identified as the battery data 145 or the usage data 150 to the model generator 115.

The model generator 115 can train the model using machine learning. The model generator 115 can use one or more machine learning techniques. The model trained by the data processing system 105 for a particular electric vehicle 905, data processing system 105, or user can be referred to as a local model. Machine learning techniques can include, for example, at least one of information-based learning, similarity-based learning, probability-based learning, error-based learning, supervised learning, unsupervised learning or deep learning. The model generator 115 can train the model using training data or historical data. The training data can include labeled or unlabeled data. The training data can include data associated with known output or measured output that can facilitate machine learning. For example, the training data can include information about driving pattern, driving behavior, or battery utilization associated with traffic information, weather information, time of day, day of week, month, or season. The data processing system 105, using one or more machine learning techniques, can train the local model using the training data to make prediction about future driving patterns (e.g., distance traveled between charges, highway driving, off-roading, city driving), driving behavior (e.g., sport mode, comfort mode, economy mode), or other battery utilization. The model generator 115 can use data collected by the monitor component 110 to train the local model. The local model can be used to generate the driver behavior patterns. The data processing system 105 can use the local model training by the model generator 115 to generate a schedule that can control charging for the electric vehicle.

The model generator 115 can use the data provided from the monitor component 110 to train the local model to generate the vehicle utilization pattern. For example, the model generator 115 can use the drive mode sensor data, the location sensor data, the temperature sensor data, the battery cell sensor data and the duration sensor to generate the vehicle utilization pattern. The local model can use the vehicle utilization pattern to make one or more predictions. The predictions can include an expected vehicle usage time, an expected drive mode, an expected duration of vehicle use and an expected energy consumption. The predictions can be used to determine a SoC amount that corresponds with the predictions. The local model can be used to establish a schedule that results in the SoC amount being reached by the expected vehicle usage time.

The model generator 115 can use the data provided from the monitor component 110 to train the local model to generate the charging behavior. For example, the model generator 115 can use the duration sensor data, the battery cell sensor data and the power source sensor data to generate the charging pattern. The local model can use the charging pattern to make one or more predictions. The predictions can include an expected charging time. The predictions can be used to assign one or more time windows. The time windows can include one or more charging cycles.

The model generator 115, prior to receiving the data from the monitor component 110, can train the local model. The model generator 115 can train the local model using data received from a remote source. For example, the model generator 115 can receive one or more weights from the server 175. The model generator 115 can apply the weights to the local model. The local model can, upon receiving the data from the monitor component 110, update the local model by inputting the data into the local model.

The model generator 115 can, using the driver preferences, update the local model. The driver, using the interface 135, can provide one or more preferences. The preferences can be a preference to prioritize SoC of the battery, a preference to prioritize SoH of the battery or a preference to prioritize both SoC of the battery and SoH of the battery. For example, the model generator 115 can use the preference to prioritize SoH of the battery to update the local model. The updated local, based on the preference to prioritize SoH of the battery, can update the time periods. For example, the duration of the low use period can be increased to increase the duration of the sub-charge state.

A preference to prioritize an act or function of or associated with the battery can refer to the higher priority function taking precedence or superseding a lower priority function. The higher priority preference can supersede, occur ahead of, or replace the lower priority function. In some cases, to the extent that the lower priority function conflicts with or cannot be executed at the same time or otherwise in conjunction with a higher priority function, the data processing system can perform the higher priority function and delay executing the lower priority function or not perform the lower priority function until a later time interval, condition or event.

The model generator 115 can generate one or more weights for the local model. The weights generated for the local model can be used to establish a relationship between the driver behavior patterns and the driver preferences. The data that is generated by the model generator 115 is included in the model data 160 and the weight data 165.

The schedule generator 120 can generate, using the local model, one or more schedules. The data processing system 105 can use the schedule generated via the local model to maximize SoH of the battery. The data processing system 105 can use the charge schedule to facilitate charging the battery of the electric vehicle 905. Facilitating charging of the battery can refer to or include executing or otherwise utilizing the charge schedule. The charge schedule can control charging of the battery so that an amount of current from a power source (e.g., power source 915 depicted in FIG. 9) varies over time. For example, the schedule generator 120 can maximize, increase, improve, or maintain the SoH of the battery be establishing the schedules to maintain the state of charge of the battery within a predetermined range, such as 20% to 80% or 40% to 80%, for example. The charge schedule can vary the amount of current delivered from the power source by reducing the amount of current delivered to the battery so as not to exceed the predetermined range for the time period. Maintaining the battery within this predetermined range in which the state of charge is less than 100% and greater than 0% can be referred to as a sub-charge state. The schedule generator 120 can improve the SoH of the battery by generating a schedule that keeps the battery in the sub-charge state during time period in which the electric vehicle is in low use. Being in low use can refer to or include, for example, driving the electric vehicle less than a predetermined number of miles (e.g., 25 miles, 50 miles, 75 miles, 100 miles, 125 miles, or 150 miles) within charges. For example, low use can include driving the electric vehicle less than 100 miles between charges or driving less than 100 miles in a day. In some cases, low use or the predetermined number of miles can be a percentage of a total range of the battery, such as 30% of the range, 40% of the range, or 50% of the range, for example.

The schedule generator 120 can also maximize, improve, increase, or otherwise maintain SoH by controlling when maximal SoC is reached. For example, the schedule generator 120 can establish a schedule that results in maximal SoC being reached by the expected driving time period. SoH of the battery is maximized by having the battery reach maximal SoC only when the vehicle is expected to be used. In an illustrative example, the data processing system 105 can determine, using the local model for a user, that the user is predicted to drive a range of 50 miles during the course of the day and in-between charging cycles. The data processing system 105, using the model, can generate a customized charging schedule for this user that controls the charging of the battery such that the battery will have sufficient charge for the electric vehicle travel at least 50 miles without another charge while still keeping the battery within the predetermined state of charge (e.g., having at least 20% charge remaining after the electric vehicle has traveled the predicted 50 miles). For the same user on a different day, or for a different user on the same day, the data processing system 105 may predict, via the local model, that the user will drive 100 miles between charges or some other range, and generate a different customized schedule for that day that controls charging of the battery such that the battery state of charge remains within the predetermined range throughout the day and in-between charges. In some cases, when predicting the amount of range to provide for the user, the data processing system 105 can include a buffer of 10 miles, 20 miles, 30 miles (or a percentage such as 5%, 10%, 15%) when establishing the charge schedule. The data used by the schedule generator 120 can be included in the schedule data 155.

In another illustrative example, the data processing system 105 can determine or predict a time at which the user of the electric vehicle will disconnect the power cable from the electric vehicle to stop charging the battery of the electric vehicle. The data processing system 105 can generate the charge schedule based on the predicted time so as to charge the battery to a predetermined state of charge by that time. For example, if the user is predicted to disconnect the power cable to stop charging the vehicle at 8 AM, then the data processing system 105 can generate a charge schedule that controls charging of the battery so as to keep the state of charge of the battery within 20%-80% for the maximum duration possible, while then allowing sufficient current to be delivered to the battery such that the battery can reach 100% state of charge by 8 AM. Thus, the data processing system 105, using the local model to generate the customized charge schedule, can maximize the state of health of the battery by keeping the state of charge of the battery within a predetermined range (e.g., 20%-80%), while also allowing the battery to reach a full charge (or other desired amount of charge based on an anticipated range between charges) by a predicted timestamp corresponding to disconnecting the power cable from the electric vehicle.

The charging controller 125 can control the charging of the battery by executing the schedules. The charging controller 125 can execute the schedules by controlling the amount of current that is applied to the battery. For example, the charging controller 125 can maintain the battery in the sub-charge state by preventing current from being provided to the battery. To control the state of charge of the battery, the schedule can include programs, scripts, commands, or other instructions that, when executed by the data processing system 105 or a component thereof, can control the amount of current supplied from the power source to the battery of the electric vehicle. For example, the schedule can include an instruction to stop or prevent the flow of current to the battery during a certain time period or when the battery reaches a certain state of charge. The schedule can include an instruction to charge the battery at a certain rate during a certain time period or until the battery reaches a certain state of charge. The schedule can include an instruction to increase or decrease the charge rate (e.g. the amount of current that is provided to the battery) based on the time periods in the schedule generated or established via the local model.

The weight transfer component 130 can provide the weights, generated for the local model, to the server 175. The weight transfer component 130 can interface with the server weight transfer component 185. The weight transfer component 130 can use the network 170 to provide the weights, generated for the local model, to the server weight transfer component 185. The weight transfer component 130 can receive weights, generated for the regional model, from the server weight transfer component 185. The weights can be generated or established by a machine learning model during a machine learning training process. The weights of the local model can facilitate generating an output value based on an input value. The output value generated using the weights applied to functions in the model and the input can predict, forecast or otherwise generate an output value responsive to an input value that may not have been used to train the local model.

The regional model generator 180 can, by applying the weights generated for the local model to the regional model, update the regional model. The regional model generator 180 can generate the weights for the regional model. The weights generated for the regional model can be provided to the weight transfer component 185 of the server 175. By providing the weights of the local model to the server 175, the data processing system 105 can reduce bandwidth utilization of the network 170 by not transmitting the entire local model or additional data. For example, transferring the weights as opposed to the entire local model or data used to train the local model can reduce network bandwidth utilization, as well as reduce memory or storage utilization at the server 175. The server 175 can use the weights to update the regional model 195 maintained on the server 175. The server 175 (e.g. via the regional model generator 180 or weight transfer component 185) can update the regional model 195 with the weights received from the local model maintained by the data processing system 105 without having to re-train the regional model 195 based on training data or additional input data.

The server 175 can update the regional model 195 using the weights from one or more data processing systems 105 associated with one or more electric vehicles. As the server 175 updates the regional model based on weights received from multiple local models corresponding to different electric vehicles, the server 175 can transmit weights of the updated regional model to one or more electric vehicles to cause the data processing systems 105 of the electric vehicles to update local models maintained by the data processing systems 105 of the electric vehicles. For example, the model generator 115 can, by applying the weights generated for the regional model to the local model, update the local model. The updated local model can be used to establish one or more schedules that are different from the schedules established before.

The data processing system 105 can allow an end user or driver of the electric vehicle to opt-in or opt-out of collecting any data of, from, or otherwise associated with the electric vehicle or user thereof. For example, the data processing system 105 can provide, via a graphical user interface, a prompt. The prompt can ask the user to opt-in to data collection. In some cases, the data processing system 105 may not collect data associated with the user, such as driver behavior, route information, or preferences, unless the user affirmatively opts-in. The data processing system 105 can be configured by default to not collect or store data. The data processing system 105 can be configured by default to not transmit any personally identifying information collected or otherwise identified or determined by the data processing system 105 for the electric vehicle or user thereof. In some cases, the data processing system 105 can anonymize data collected or identified for the electric vehicle, and transmit the anonymized data to a server 175. The data processing system 105 can transmit the anonymized data to the server 175 responsive to or subsequent to the user affirmatively opting-in to sharing data with the server 175.

For example, the data processing system 105 can provide a prompt via the graphical user interface responsive to an event, condition, or trigger. The condition can refer to or include a new user entering the vehicle or setting up a new profile for driving the vehicle, for example. The event can refer to a user entering the vehicle, for example. A trigger can refer to a user connecting a charging cable to the vehicle or a user turning on the vehicle. Responsive to the event, condition or trigger, the data processing system 105 can request input from the user regarding data sharing preferences for the user. The data processing system 105 can request the input via the graphical user interface, an audio interface, a touch interface, or a button or other user interface. The user can provide an indication to opt-in to data sharing or opt-out of data sharing. The indication to opt-in can include, for example, an audio command indicating affirmatively to opt-in, or a selection of a user interface element or widget that indicates affirmatively to opt-in. The indication to opt-out can be a default setting such that the data processing system 105 can determine that in the absence of any indication to affirmatively opt-in, that the user has opted-out of data sharing.

Figure 2:
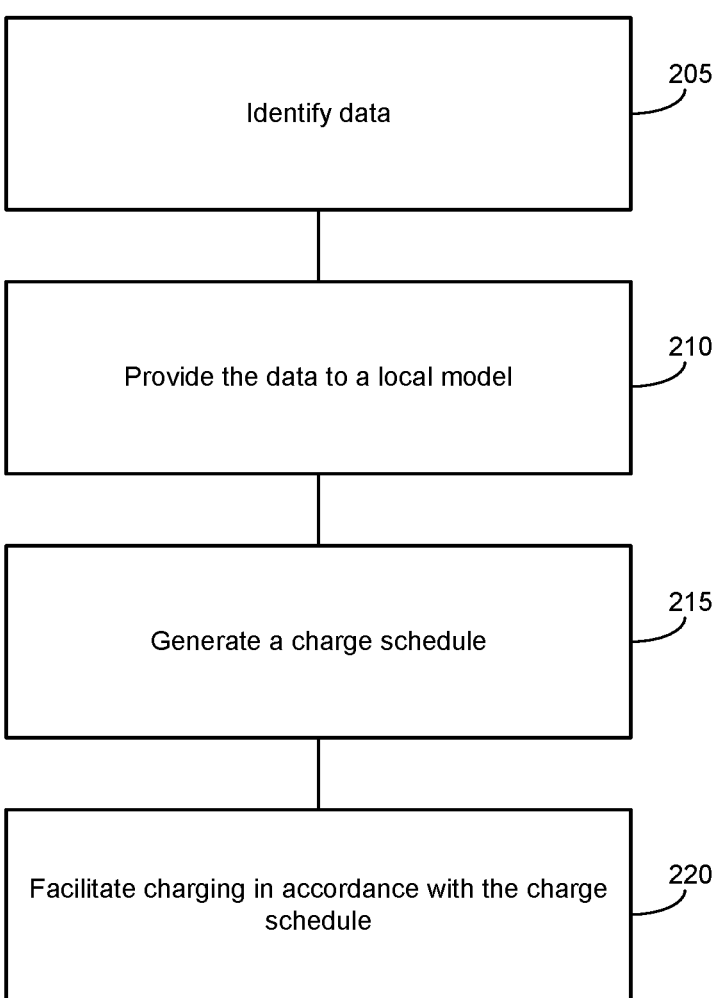
FIG. 2 depicts an example flow diagram of a process to control state of charge of an electric vehicle battery using a schedule, in accordance with an implementation.

FIG. 2 is a flow diagram of a process 200 where a schedule to control charging of a battery of an electric vehicle is established. The process 200 can be performed by one or more system or component depicted in FIG. 1, 9 or 12, including, for example, a data processing system. At ACT 205, a data processing system can identify data. For example, the monitor component 110 can identify data. The data can include the battery data 145 or the usage data 150. The battery data 145 can include at least the SOC of the battery, the SoH of the battery and energy consumption of the battery. The battery data 145 can be provided to the data repository 140. The usage data 150 can include at least the drive mode of the electric vehicle, the frequency of charging the battery, and the frequency of using the vehicle. The usage data 150 can be provided to the data repository 140. The frequency of charging the battery can indicate the number of times the battery is charged. The number of times the battery is charged can be recorded every day, every week, every year, or any other possible time period. The frequency of using the vehicle can indicate the number of times that the vehicle is used. The number of times that the vehicle is used can be recorded every day, every week, every year, or any other possible time period.

At ACT 210, the data processing system can provide the data to a local model. For example, the monitor component 110 can provide the data to the model generator 115. The model generator 115 can generate the local model described herein based on the data provided by the monitor component 110. The model generator 115 can update the local model if the local model, prior to receiving the data from the monitor component 110, was previously generated. The model generator 115 can update the local model if the data provided by the monitor component 110 is different than the battery data 145 or the usage data 150. The model generator 115 can generate the model data 160. The model data 160 can include the local model. The model data 160 can be provided to the data repository 140.

At ACT 215, the data processing system can generate a charge schedule. The charge schedule can control charging the battery so that an amount of current from a power source varies over time. For example, the schedule generator 120 can generate the charge schedule. The schedule generator 120 can establish the charge schedule by using the model data 160. The schedule can include at least one of a time window for charging the battery, a time window for conditioning the battery, a time window for fast-charging the battery, a time window for conditioning the battery, a time window for warming the vehicle, a time window for cooling the vehicle, a time window for performing maintenance, or a time window for performing software updates. The schedule generator 120 can update the schedule if, prior to using the local model, the first schedule was previously established. The schedule generator 120 can update the schedule if the model data 160 has changed. The schedule generator 120 can generate the schedule data 155. The schedule data 155 can include the schedule. The schedule data 155 can be provided to the data repository 140.

At ACT 220, the data processing system can facilitate charging the battery of the electric vehicle in accordance with the charge schedule. For example, the charging controller 125 can execute the schedule. The charging controller 125 can determine that a power source is electrically coupled to the battery. The charging controller 125, upon determining that the power source is electrically coupled to the battery, can control the amount of current supplied to the battery by executing the schedule. The data processing system can facilitate charging the battery in accordance with the schedule by controlling the amount of current based on instructions or commands provided by the charge schedule. The charging controller 125, by executing the schedule, can prevent current from being provided to the battery. The charging controller 125, by executing the schedule, can prevent conditioning the battery. While the present disclosure provides several acts that result in the first schedule being established, it should be noted that the features of the present disclosure are equally applicable to any one or more possible acts that can result in the first schedule being established.

The schedule can include instructions to not charge during a time period. For example, a user can plug in a charger to the electric vehicle. Responsive to plugging in the charger to the electric vehicle, the data processing system of the electric vehicle can invoke or launch the schedule. The data processing system can invoke, launch or otherwise access the schedule prior to allowing current to flow from the charger to the battery of the electric vehicle. The data processing system can identify an instruction in the schedule that controls the amount of current supplied from the charger to the battery for the current time. In some cases, the schedule can indicate to not charge the battery (e.g., 0 amps of current), to trickle charge the battery, or provide another amount of current to the battery. In the event the schedule indicates to not charge the battery at the current moment, the data processing system can prevent the charger from supplying any current to the battery of the vehicle even though the user has just connected the charging plug to the electric vehicle. In some cases, the data processing system can allow the current from the charger to power other electronic devices on the electric vehicle, but without charging the battery, in accordance with the schedule generated using the local model trained via machine learning.

Figure 3:
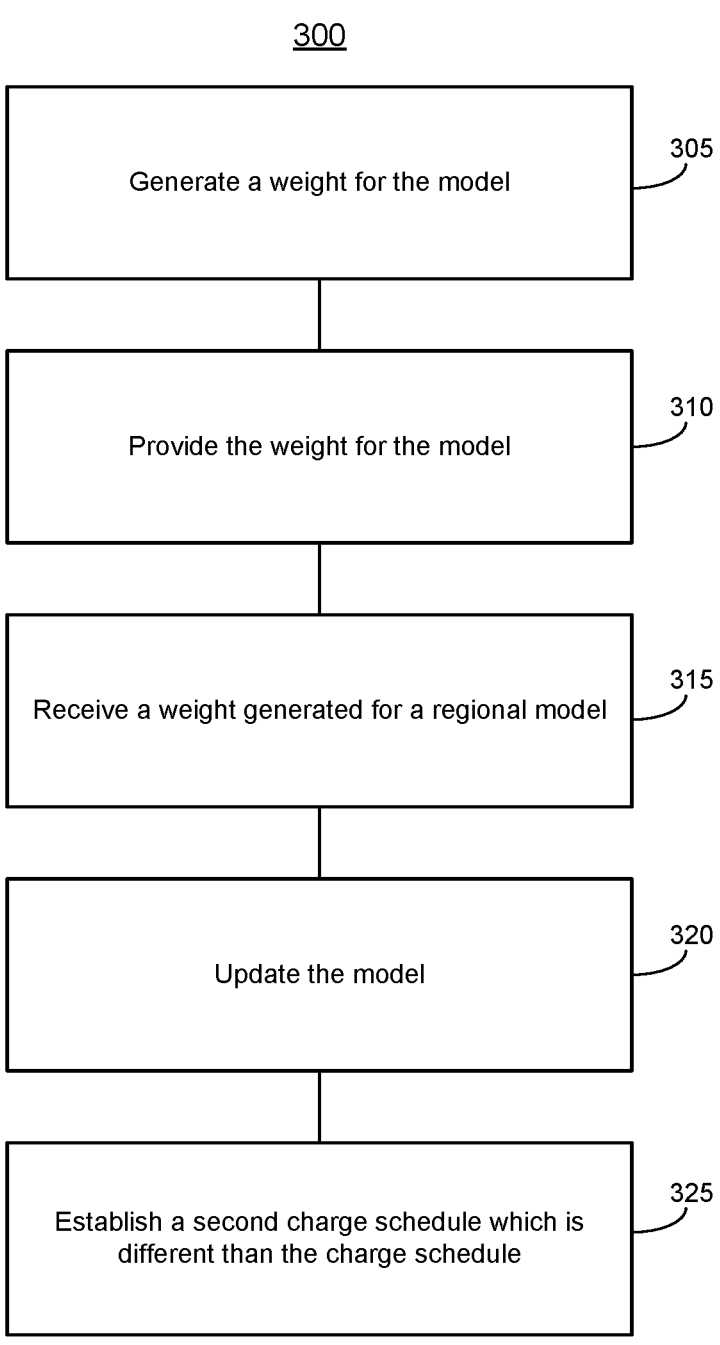
FIG. 3 depicts an example flow diagram of a process to establish a schedule using machine learning, in accordance with an implementation.

FIG. 3 is a flow diagram of a process 300 where a regional model can be updated using weights generated for a local model. The process 300 can be performed by one or more system or component depicted in FIG. 1, 9 or 12, including, for example, a data processing system. In ACT 305, a data processing system can generate one or more weights for the local model. For example, the model generator 115 can generate one or more weights for the local model. The weights generated for the local model can be generated using the battery data 145, the usage data 150, the schedule data 155 or the model data 160. The model generator 115 can update the local model by applying, to the local model, the weights generated for the local model. The model generator 115 can generate the weight data 165. The weight data 165 can include the weights generated for the local model. The weight data 165 can be provided to the data repository 140.

In ACT 310, the data processing system can provide the weights generated for the local model. For example, the weight transfer component 130 can provide the weights generated for the local model to the server weight transfer component 185. The server weight transfer component 185 can provide the weights generated for the local model to the regional model generator 180. The regional model generator 180 can update the regional model by applying, to the regional model, the weights generated for the local model. The regional model generator 180 can generate the regional model data 195. The regional model data 195 can include the updated regional model. The regional model generator 180 can generate one or more weights for the regional model. The regional model generator 180 can generate the weight data 197 which can include the weights generated for the local model and the weights generated for the regional model.

In ACT 315, the data processing system can receive the weights generated for the regional model. For example, the weight transfer component 130 can receive, from the server weight transfer component 185, the weights generated for the regional model. The weight transfer component 130 can provide the weights, generated for the regional model, to the model generator 115.

In ACT 320, the data processing system can update the local model. For example, the model generator 115 can update the local model by applying, to the local model, the weights generated for the regional model. The model generator 115 can update the model data 160 or the weight data 165. The schedule generator 120 can determine that the model data 160 or the weight data 165 has been updated.

In ACT 325, the data processing system can generate a second charge schedule. For example, the schedule generator 120 can generate the second charge schedule as a new charge schedule that replaces the previous charge schedule. The data processing system can generate the second charge schedule as an updated charge schedule or a modified charge schedule that is a revised version of the previous charge schedule. The schedule generator 120 can generate the schedule by using the updated model data 160 or the updated weight data 165. The second charge schedule can be different from the previous schedule in at least one aspect. For example, the second charge schedule can have a different time window for charging or indicate different amounts of state of charge at different time windows so as to vary the amount of current delivered during a time window from a power source to charge a battery relative to the previous schedule.

Figure 4:
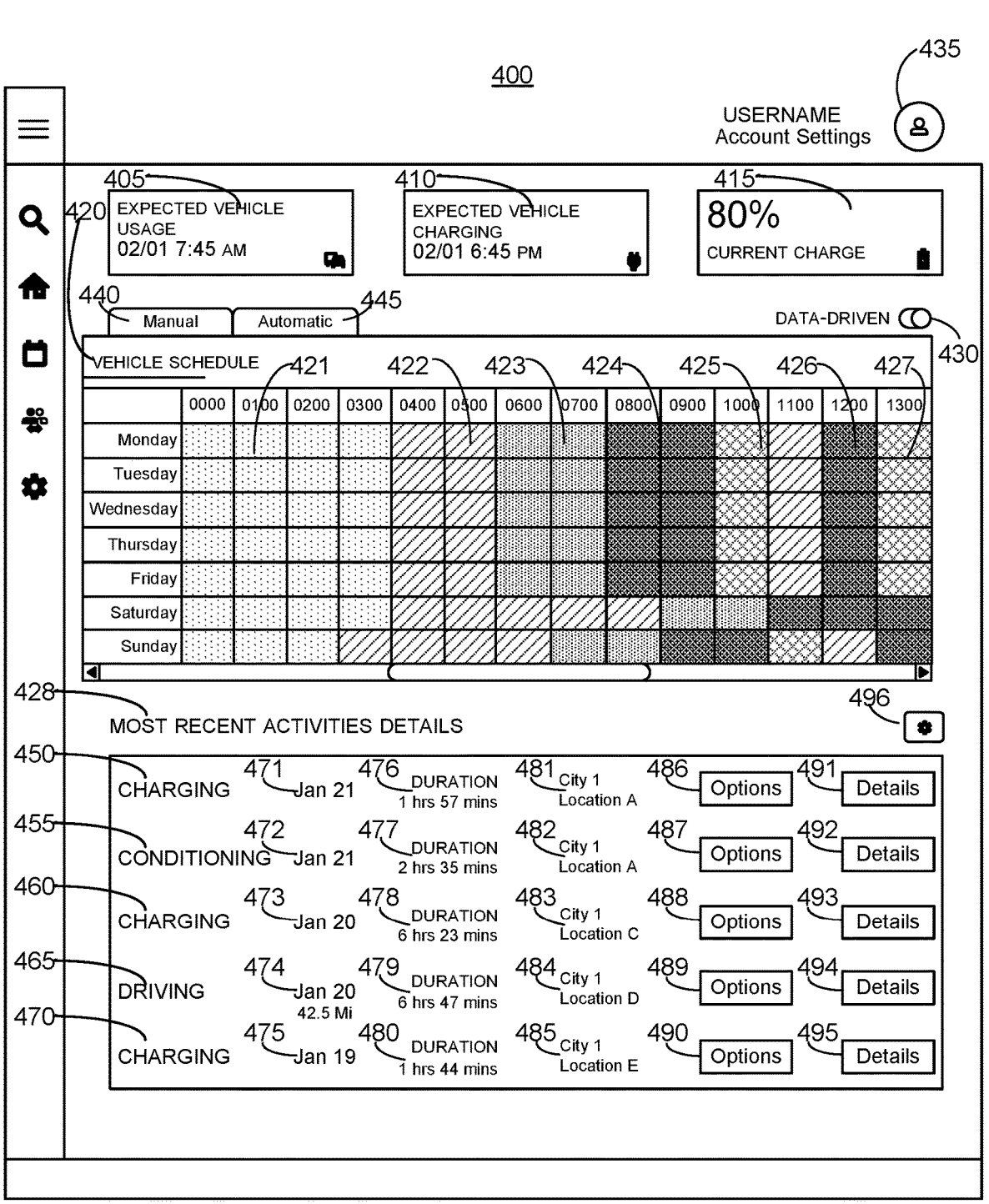
FIG. 4 depicts an example user interface to present a schedule that controls state of charge of an electric vehicle battery, in accordance with an implementation.

FIG. 4 represents a user interface 400 that can present a schedule 420 for charging an electric vehicle. For example, the interface 135 can present the user interface 400. The charge schedule 420 can be established by the schedule generator 120. The user interface 400 can include an expected vehicle usage time 405, an expected vehicle charging time 410, a current charge 415 of the battery, a recent activity details 428, a data driven toggle 430, an account settings tab 435, a manual tab 440, an automatic tab 445 and a gear icon 496. The expected vehicle usage time 405 can indicate when the vehicle is expected to be used. The expected vehicle charging time 410 can indicate when the battery is expected to be charged. The current charge 415 of the battery can indicate the current SoC of the battery. The charge schedule 420 can present at least one of a time window 421 for charging the battery 421, a time window 422 for conditioning the battery, a time window 423 for fast-charging the battery, a time window 424 for warming the vehicle, a time window 425 for cooling the vehicle, a time window 426 for performing maintenance, or a time window 427 for performing software updates. The time windows 421, 422, 423, 424, 425, 426, and 427 can include a duration for the time window, a day of the week, and time of day. For example, the time window 421 can indicate that at 0100 on a Monday the battery will be charged.

The data driven toggle 430 can used to control if the vehicle schedule will be generated using data. For example, the user can toggle the data driven toggle 430 from on to off by selecting the data driven toggle 430. If the data driven toggle 430 is in the off position the establishing of the charge schedule 420 will not include data that has been used in the local model. The user would need to provide the necessary information to establish the schedule. If the data driven toggle 430 is in the on position the establishing of the charge schedule 420 can use both the data provided to the model generator 115 and user input. The account settings tab 435 can be selected by the user. When the account settings tab 435 is selected the user can be provided information. The information can include notification settings. For example, the user can set a notification setting that can result in the user being notify when software updates our occurring.

The user can select the manual tab 440 when the user wants to input a manual schedule. The user can select the automatic tab 445 when the user wants the schedule generator to establish a vehicle schedule. The most recent activities details 428 can include a charging activity 450, a conditioning activity 455, a charging activity 460, a driving activity 465 and a charging activity 470. The activities 450, 455, 460, 465 and 470 can indicated previous activities. The charging activity 450 can include a date 471, a duration 476, a location 481, an options tab 486, and a details tab 491. The date 471 can indicate a month and a day of the month when the charging activity 450 occurred. The duration 476 can indicate the duration of the charging activity 450. The location 481 can indicate where the charging activity 481 occurred. The options tab 486 can be selected by the user. The options tab 486 can allow the user to adjust the options for charging activity 450. For example, the user can decide to remove the duration 476 from the most recent activities details 428. The details tab 491 can include additional information about the charging activity 450. For example, the additional information can include that the charging activity was an automatic charging activity.

The conditioning activity 455 can include a date 472, a duration 477, a location 482, an options tab 487, and a details tab 492. The charging activity 460 can include a date 473, a duration 478, a location 483, an options tab 488, and a details tab 493. The driving activity 465 can include a date 474, a duration 479, a location 484, an options tab 489 and a details tab 494. The charging activity 470 can include a date 475, a duration 480, a location 485, an options tab 490, and a details tab 495. The activities dates 472, 473, 474, and 475 can represent similar information to that of the date 471. The durations 477, 478, 479, and 480 can represent similar information to that of the duration 476. The locations 482, 483, 484, and 485 can represent similar information to that of the location 481. The options tabs 487, 488, 489, and 490 can represent similar information to that of the options tab 486. The details tabs 492, 493, 494, and 495 can represent similar information to that of the details tab 491. The driver can select the gear icon 496 to adjust the position of the information on the user interface 400.

Figure 5:
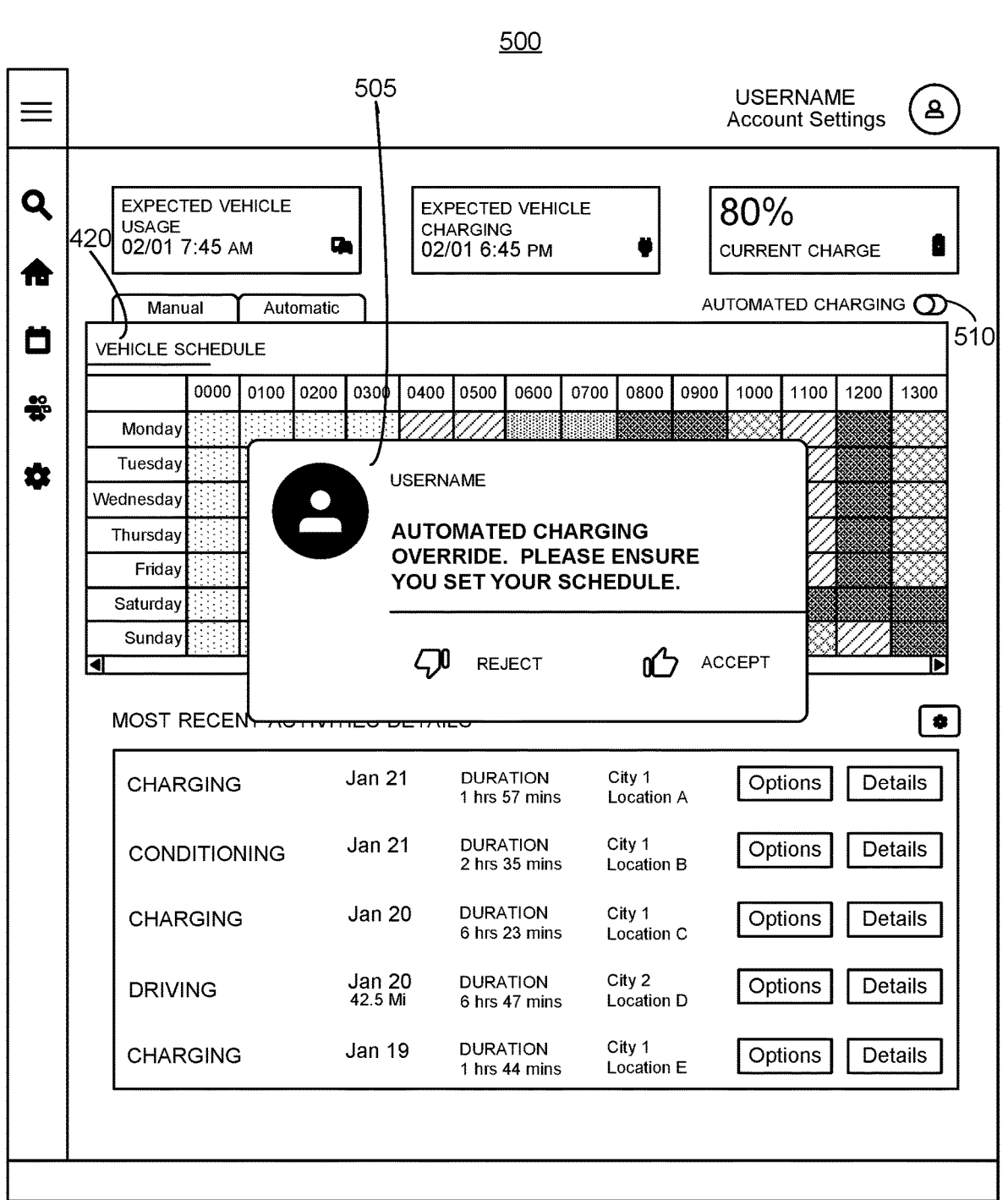
FIG. 5 depicts an example user interface to override a schedule that controls state of charge of an electric vehicle battery, in accordance with an implementation.

FIG. 5 represents a user interface 500 where a vehicle schedule can be overridden. For example, the interface 135 can present the user interface 500. The user interface 500 can include the charge schedule 420, a prompt 505, and an automated charging toggle 510. A driver can override the charge schedule 420 by selecting accept on the prompt 505. Overriding the schedule can refer to or include disabling, not performing or otherwise not executing the instruction in the schedule, and instead executing the command or instruction from the user input. The driver can be presented with the prompt 505 upon toggling the automated charging toggle 510 to off. The interface 135 can receive an indication to override the charge schedule 420. The indication to override the charge schedule 420 can include data. The data can include the state of charge of the battery, the state of health of the battery, or the drive mode of the electric vehicle. The interface 135 can provide the indication to override the charge schedule 420 to the schedule generator 120. The schedule generator 120 can disable execution of the charge schedule 420. When execution of the charge schedule 420 has been disabled, the data processing system 105 may not use the charge schedule 420 to control charging of the battery. For example, the data processing system 105, responsive to receiving current from the power source, can deliver the full, available amount of current to charge the battery of the electric vehicle without attempting to control the amount of current so as to keep the battery within the predetermined state of charge range.

Figure 6:
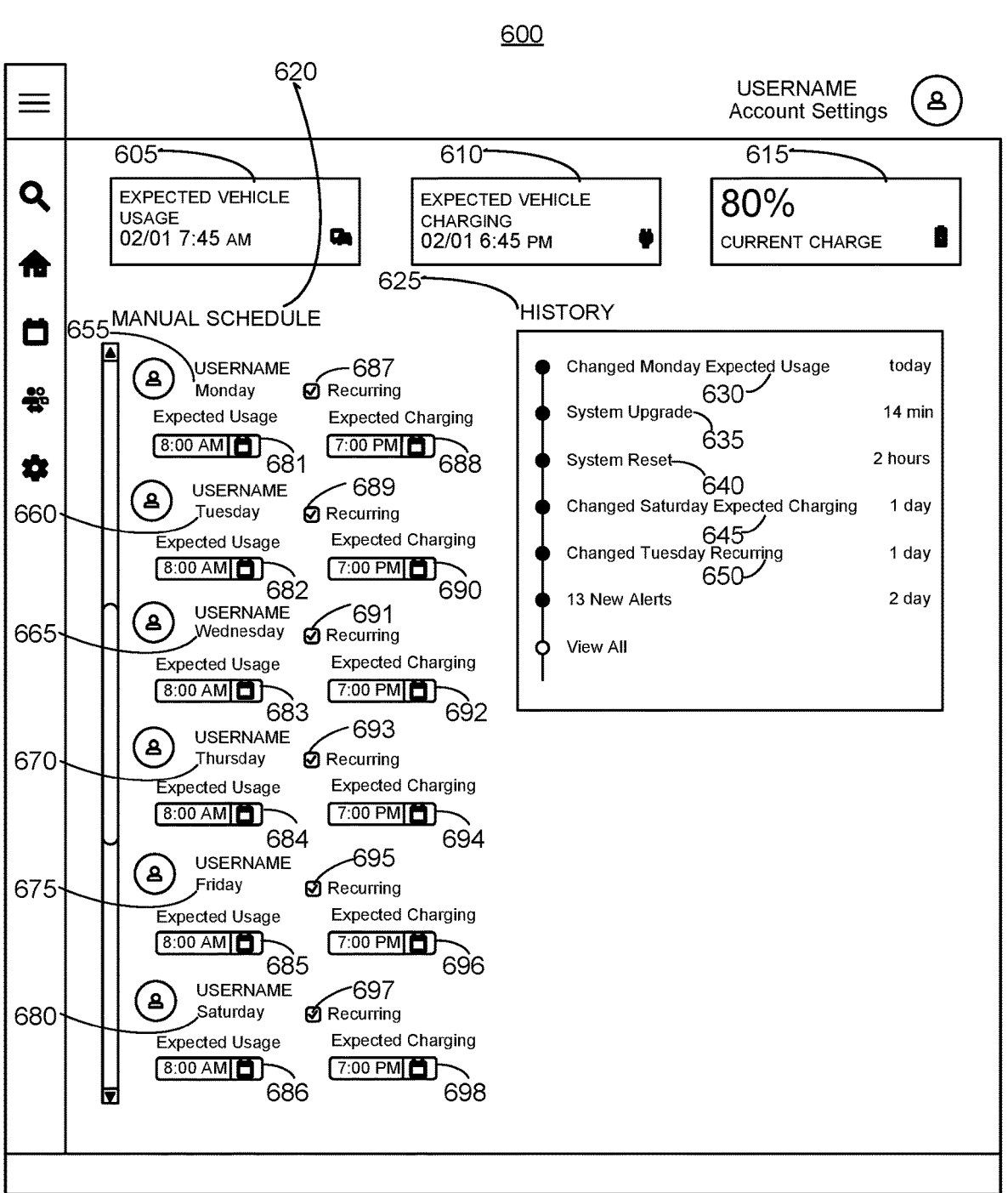
FIG. 6 depicts an example user interface to present a schedule to control state of charge of an electric vehicle battery, in accordance with an implementation.

FIG. 6 represents a user interface 600 that can present a manual schedule. For example, the interface 135 can present the user interface 600. The user interface 600 can include a manual schedule 620. The user interface 600 can be presented when the driver has selected the manual tab 440. The user interface 600 can include an expected vehicle usage time 605, an expected vehicle charging time 610, a current charge 615 of the battery, and a history 625. The schedule 420 can include a date 655, a date 660, a date 665, a date 670, a date 675, and a date 680. The date 655 can include an expected usage time 681 and an expected charging time 688. The date 660 can include an expected usage time 682 and an expected charging time 690. The date 665 can include an expected usage time 683 and an expected charging time 692. The date 670 can include an expected usage time 684 and an expected charging time 694. The date 675 can include an expected usage time 685 and an expected charging time 696. The date 680 can include an expected usage time 686 and an expected charging time 698. The driver can be prompted to provide the expected usages times 681, 682, 683, 684, 685, and 686 after selecting the manual tab 440. The driver can be prompted to provide the expected charging times 688, 690, 692, 694, 696 and 698 after selecting the manual tab 440. The driver can indicate that expected usage time 681 and the expected charging time 688 are recurring by selecting a recurring tab 687. The driver can indicate that expected usage time 682 and the expected charging time 690 are recurring by selecting a recurring tab 689. The driver can indicate that expected usage time 683 and the expected charging time 692 are recurring by selecting a recurring tab 691. The driver can indicate that expected usage time 684 and the expected charging time 694 are recurring by selecting a recurring tab 693. The driver can indicate that expected usage time 685 and the expected charging time 696 are recurring by selecting a recurring tab 695. The driver can indicate that expected usage time 686 and the expected charging time 698 are recurring by selecting a recurring tab 697.

The history information 625 can be generated as a result of the driver updated the manual schedule 620. For example, a prompt 630 can indicate that the driver changed the expected usage time 681. A prompt, 635 can indicate that a software update has occurred. A prompt 640 can indicate that a system reset has occurred. A prompt 645 can indicate that the driver changed the expected charging time 698. A prompt 650 can indicate that the driver selected the recurring tab 698.

The interface 135 can provide the manual schedule 620 to the schedule generator 120. The schedule generator 120 can establish the manual schedule 620. The schedule generator 120 can provide the manual schedule 620 to the charging controller 125. The charging controller 125 can execute the manual schedule 620.

The interface 135 can provide a schedule to a driver. The interface 135 can receive an input from the driver. The input can be at least one of an input to prioritize the SoC of the battery, an input to prioritize the SoH of the battery or an input to prioritize energy consumption. The interface 135 can provide the input from the driver to the model generator 115. The model generator can generate one or more weights for the local model using the input from the driver. The weight transfer component 130 can provide the weights generated for the local model, using the input from the driver, to the server weight transfer component 185. The regional model generator 180 can update the regional model by applying the weights generated for the local model using the input from the driver. The regional model generator 180 can generate one or more weights for the updated regional model. The server weight transfer component 185 can provide the weights generated for the updated regional model to the weight transfer component 130. The model generator 115 can update the local model by applying, to the local model, the weights generated for the updated regional model.

The monitor component 110 can determine a change in the battery data 145 or a change in the usage data 150. The monitor component 110 can provide, to the model generator 115, the change in the battery data 145 or the change in the usage data 150. The model generator 115 can generate, using the change in the battery data 145 or the change in the usage data 150, one or more weights for the local model. The model generator 115 can provide, to the weight transfer component 130, the weights generated for the local mode. The weight transfer component 130 can provide, to the server weight transfer component 185, the weights generated for the local model. The server weight transfer component 185 can provide, to the regional model generator 180, the weights generated for the local model. The regional model generator 180 can generate, using the weights generated for the local model, one or more weights for the regional model. The regional model generator 180 can provide, to the server weight transfer component 185, the weights generated for the regional model. The server weight transfer component 185 can provide, to the weight transfer component 130, the weights generated for the regional model. The weight transfer component 130 can provide, to the model generator 115, the weights generated for the regional model. The model generator 115 can update the local model by applying, to the local model, the weights generated for the regional model. The model generator 115 can provide the updated local model to the schedule generator 120. The schedule generator 120 can establish a schedule using the updated local model. The schedule generator 120 can provide the schedule to the charging controller 125. The charging controller 125 can execute the schedule.

The interface 135 can provide a schedule to a driver. The interface 135 can receive an indication from the driver. The indication can be the driver selecting a prompt to adopt the schedule. Adopting the schedule can refer to or include accepting the schedule, activating the scheduling, establishing the schedule for the electric vehicle, or otherwise using the schedule. The interface 135 can provide the indication to adopt the schedule to the schedule generator 120. The schedule generator 120 can establish the electric vehicle schedule using the indication to adopt the electric vehicle schedule. The charging controller 125 can execute the electric vehicle schedule.

The interface 135 can provide a schedule to a driver. The interface 135 can receive an indication from the driver. The indication can be an indication to override the schedule. The interface 135 can provide the indication to override the schedule to the model generator 115. The model generator 115 can generate, using the indication to override the schedule, one or more weights for the local model. The model generator 115 can provide, to the weight transfer component 130, the weight generated for the local model. The weight transfer component 130 can provide, to the server weight transfer component 185, the weights generated for the local model. The server weight transfer component 185 can provide, to the regional model generator 180, the weights generated for the local model. The regional model generator 180 can generate, using the weights generated for the local model, one or more weights for the regional model. The regional model generator 180 can provide, to the server weight transfer component 185, the weights generated for the regional model. The server weight transfer component 185 can provide, to the weight transfer component 130, the weights generated for the regional model. The weight transfer component 130 can provide, to the model generator 115, the weights generated for the regional model. The model generator 115 can update the local model by applying, to the local model, the weights generated for the regional model. The model generator 115 can provide the updated local model to the schedule generator 120. The schedule generator 120 can establish a schedule using the local model. The schedule generator 120, upon establishing the schedule, can provide the schedule to the charging controller 125. The charging controller 125 can execute the schedule.

The weight transfer component 130 can receive, from the server weight transfer component 185, the weight generated for the regional model. The weight transfer component 130 can determine that the weight generated for the regional model has changed. The weight transfer component 130 can provide the weight generated for the regional model to the model generator 115. The model generator 115 can apply the weight generated for the regional model to the local model.

Figure 7:
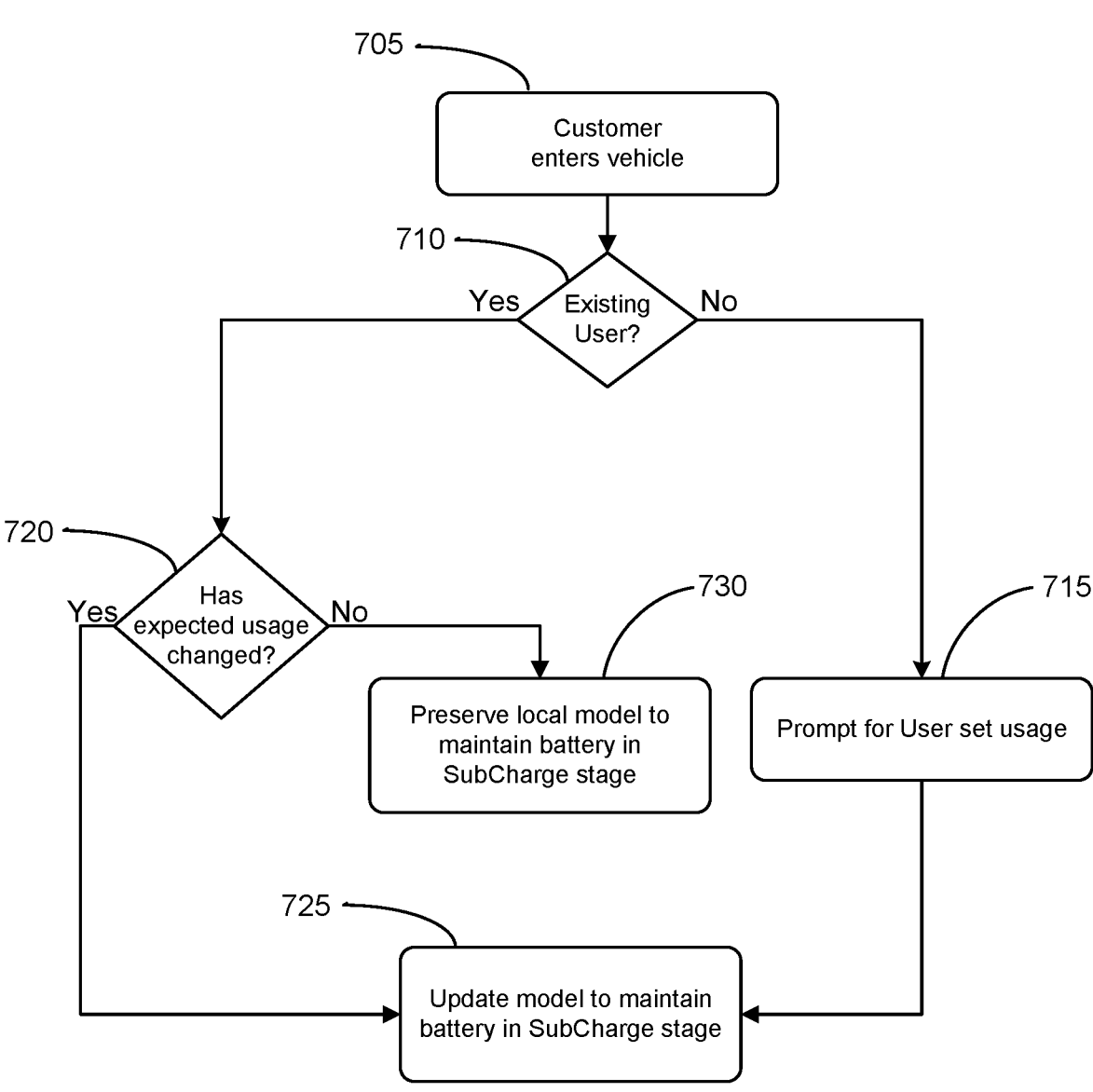
FIG. 7 depicts an example flow diagram of a process to update a local model used to establish a schedule to control state of charge of an electric vehicle battery, in accordance with an implementation.

FIG. 7 is a flow diagram of a process 700 where a user input can be requested. In ACT 705, a customer enters a vehicle. One or more acts of the process 700 can be performed by one or more component depicted in FIG. 1, including, for example, a data processing system. At ACT 710, a data processing system can determine if the customer is an existing user. For example, the monitor component 110 can determine if the battery data 145 or the usage data 150 is affiliated with the customer. The customer is an existing user if the battery data 145 or the usage data 150 is affiliated with the customer. The customer is not an existing user if the battery data 145 or the usage data 150 is not affiliated with the customer. The process will move to ACT 715 if the customer is not an existing user. The process will move to ACT 720 if the customer is an existing user.

At ACT 715, the data processing system can present, to the customer, a prompt to provide a set usage. The set usage can include at least one of when the customer expects to use the vehicle, when the customer expects to charge the vehicle, what drive mode the customer expects to use. For example, the interface 135 can provide, to the customer, the prompt to provide the set usage. The interface 135 can receive, from the customer, the set usage. The interface 135 can provide the set usage to the monitor component 110. The monitor component can update, using the set usage, the battery data 145 or the usage data 150.

At ACT 720, the data processing system can determine if the data affiliated with the existing user has changed. For example, the monitor component 110 can determine if the battery data 145 or the usage data 150 has changed. The process will move to ACT 725 if the battery data 145 or the usage data 150 has changed. The process will move to ACT 730 if the battery data 145 or the usage data 150 has not changed.

At ACT 725, the data processing system can update a local model to maintain the battery in a sub-charge stage. For example, the model generator 115 can update the local model. The updated local model can be used by the schedule generator 120 to establish a schedule that maintains the battery in the sub-charge stage. The charging controller 125 can then execute the schedule that maintains the battery in the sub-charge stage.

At ACT 730, the data processing system can preserve a local model to maintain the battery in the sub-charge stage. For example, the model generator 115 can preserve a local model. The local model can maintain the battery in the sub-charge stage. The charging controller 125 can execute the schedule that was established using the local model.

Figure 8:
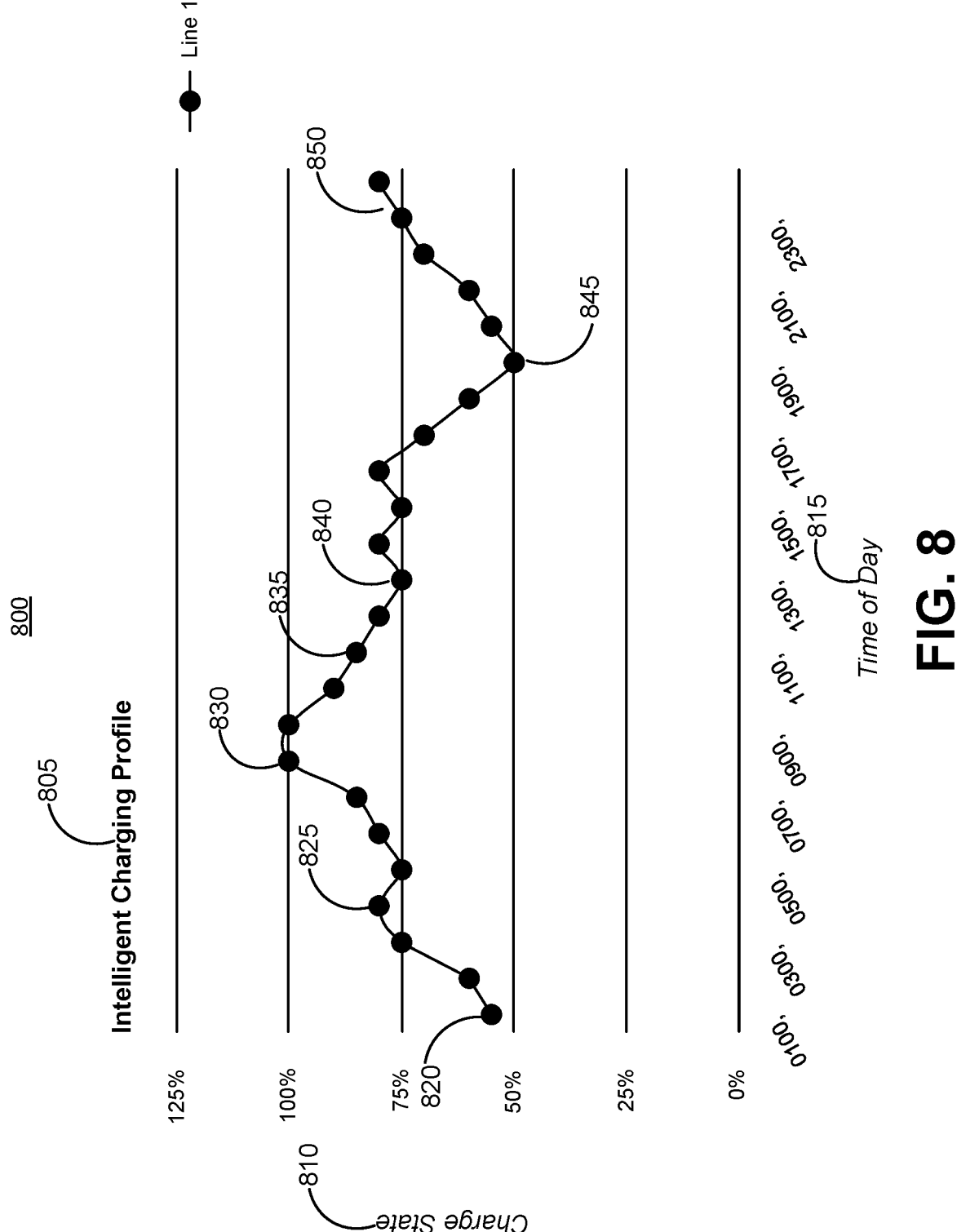
FIG. 8 depicts an example intelligent charging profile.

FIG. 8 represents an example user interface 800 that can present an intelligent charging profile. For example, the interface 135 can present the user interface 800. The user interface 800 can include an intelligent charging profile 805. The intelligent charting profile 805 can be presented as a graph having a first axis (e.g., an x-axis or horizontal axis) that represents the time of day 815, and a second axis (e.g., a y-axis or vertical axis) that represents the charge state 810. The intelligent charging profile 805 can include one or more data points (e.g., data points 820, 825, 830, 835, 840, 845). The data points 820, 825, 830, 835, 840, 845 and 850 can represent SoC at a certain time. For example, data point 830 can represent that at 0900 a battery had a SoC of 100%.

The intelligent charging profile 805 can be generated by the data processing system 105. The intelligent charging profile 805 can be generated in response to at least one of the charging controller 125 executing a schedule, vehicle utilization or a combination of both. For example data points 820 and 825 can represent the charging controller 125 executing a schedule to charge a battery. Data points 835 and 840 can represent vehicle utilization. Data points 845 and 850 can represent the charging controller executing a schedule to fast-charge a battery. Fast-charging can refer to or include delivering a high amount of current to the battery to charge the battery to a certain state of charge within a short time frame (e.g., charge 80% of the battery within 1 hour).

Figure 9:
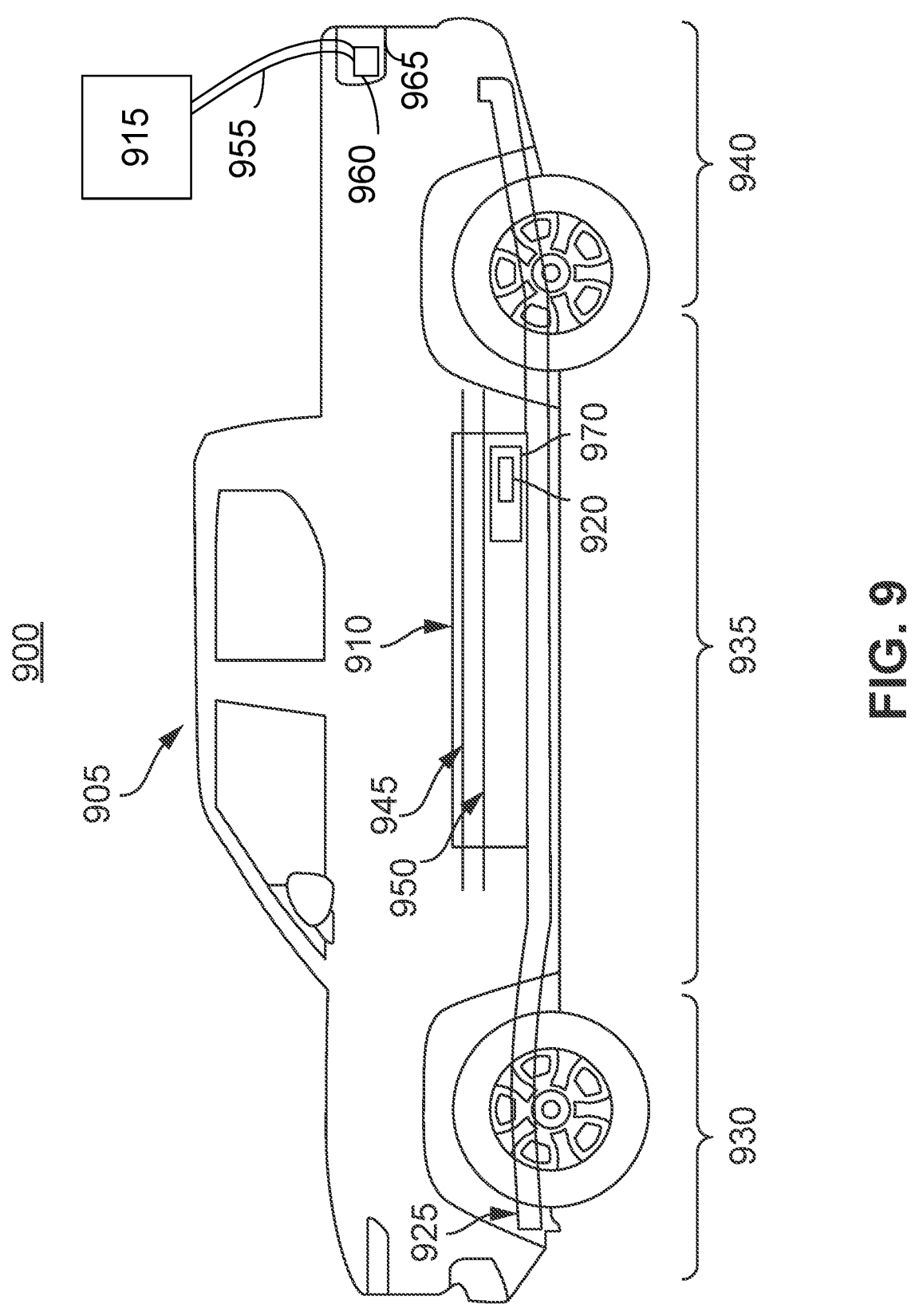
FIG. 9 depicts an example electric vehicle.

FIG. 9 depicts an example cross-sectional view 900 of an electric vehicle 905 installed with at least one battery pack 910. Electric vehicles 905 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 910 can also be used as an energy storage system to power a building, such as a residential home or commercial building. Electric vehicles 905 can be fully electric or partially electric (e.g., plug-in hybrid) and further, electric vehicles 905 can be fully autonomous, partially autonomous, or unmanned. Electric vehicles 905 can also be human operated or non-autonomous. Electric vehicles 905 such as electric trucks or automobiles can include on-board battery packs 910, battery modules 970, or battery cells 920 to power the electric vehicles. The battery cells 920 can include cylindrical cells, prismatic cells, or pouch cells, for example. The electric vehicle 905 can include a chassis 925 (e.g., a frame, internal frame, or support structure). The chassis 925 can support various components of the electric vehicle 905. The chassis 925 can span a front portion 930 (e.g., a hood or bonnet portion), a body portion 935, and a rear portion 940 (e.g., a trunk, payload, or boot portion) of the electric vehicle 905. The battery pack 910 can be installed or placed within the electric vehicle 905. For example, the battery pack 910 can be installed on the chassis 925 of the electric vehicle 905 within one or more of the front portion 930, the body portion 935, or the rear portion 940. The battery pack 910 can include or connect with at least one busbar, e.g., a current collector element. For example, the first busbar 945 and the second busbar 950 can include electrically conductive material to connect or otherwise electrically couple the battery modules 970 or the battery cells 920 with other electrical components of the electric vehicle 905 to provide electrical power to various systems or components of the electric vehicle 905.

The electric vehicle 905 can receive electrical energy or charge from a power source 915. The power source 915 can refer to or include an electric vehicle charger. The power source 915 can provide alternative current or direct current to the electric vehicle 905 to charge the battery module 970 or battery pack 910. The power source 915 can be any type of power source capable or configured to charge an electric vehicle or battery pack 910 thereof. For example, the power source 915 can be or include a level 1 charging station, a level 2 charging station, or a level 3 charging station. The power source 915 can be a charging station installed at a residential location (e.g., a home or residential dwelling) or a commercial location (e.g., an office building, retail store, shopping area, grocery store, public parking lot, street parking, or other public charging station).

The power source 915 can be electrically coupled to the electric vehicle 905 via a power cable 955 and an electric vehicle charging plug 960. The power cable 955 can be any type of power cable capable of delivering current from the power source 915 to the electric vehicle 905. The charging plug 960 can be any type of plug or connector capable of interfacing or electrically coupling with a charging port 965 of the electric vehicle 905. Thus, the power source 915 can be electrically coupled to the battery pack 910 via the power cable 955, the charging plug 960 and the charging port 965.

Figure 10:
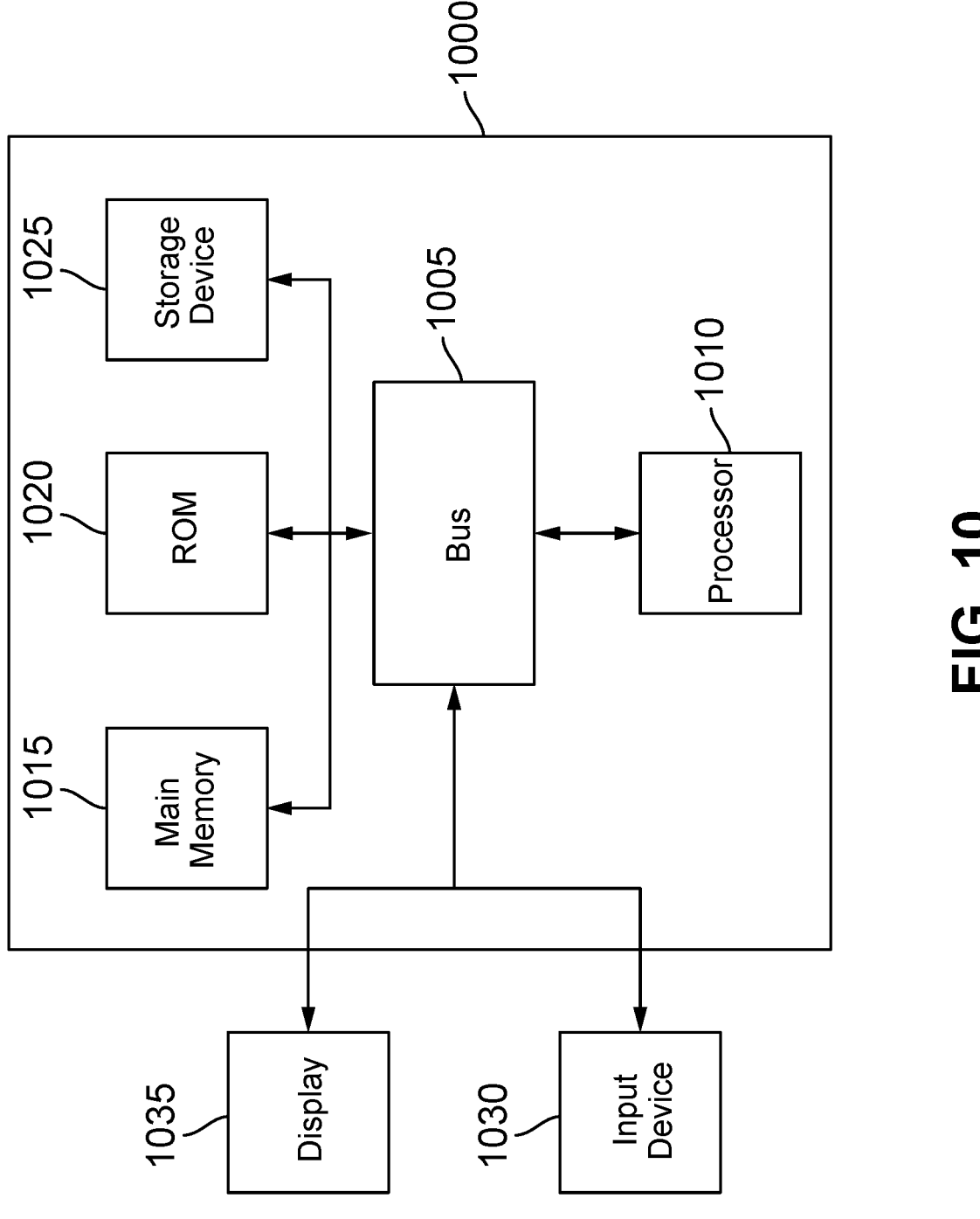
FIG. 10 is a block diagram illustrating an example architecture for a computer system that can be employed to implement elements of the systems and methods described and illustrated herein, including, for example, the systems depicted in FIG. 1, the methods depicted in FIGS. 2-3 and 7, and the user interfaces depicted in FIGS. 4-6 and 8.

FIG. 10 depicts an example block diagram of an example computer system 1000. The computer system or computing device 1000 can include or be used to implement a data processing system or its components, such as data processing system 105 for example. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the electric vehicle 905 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims.

Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Components or circuitry depicted in FIG. 10 can include, or be configured to perform, one or more functions of components, modules or circuitry depicted in any other figure herein, including, for example, the systems or circuitry depicted in FIGS. 1 and 9. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a data processing system of an electric vehicle, the data processing system comprising one or more processors, coupled to memory, to:
identify data comprising a state of charge of a battery of the electric vehicle, a state of health of the battery of the electric vehicle, and a drive mode of the electric vehicle;
receive, from a server, a weight generated for a regional model that includes charging characteristics of electric vehicles across a region;
generate, based on input of the data and the weight into a model trained with machine learning, a charge schedule to charge the battery of the electric vehicle, wherein the charge schedule controls charging of the battery so that an amount of current from a power source varies over time;
facilitate, responsive to the power source electrically coupled to the battery of the electric vehicle, charging of the battery of the electric vehicle in accordance with the charge schedule; and
prevent conditioning of the battery in accordance with the charge schedule.

2. The system of claim 1, comprising the data processing system to:
provide, to the server, a second weight generated for the model using the data, wherein the server updates the regional model based on the second weight generated for the model;

receive, from the server, a third weight generated for the regional model responsive to the regional model having been updated based on the second weight;
update the model with the third weight generated for the regional model; and
establish, using the model updated with the third weight, a second charge schedule different from the charge schedule.

3. The system of claim 2, comprising the data processing system to:
determine that the weight generated for the regional model has changed; and
apply the weight generated for the regional model to the model, wherein the model is updated.

4. The system of claim 1, comprising the data processing system to:
execute the charge schedule to facilitate charging of the battery; and
prevent, responsive to execution of the charge schedule, current from being provided to the battery of the electric vehicle.

5. The system of claim 1, comprising the data processing system to:
present, via a graphical user interface, the charge schedule;
receive, via the graphical user interface, an indication to adopt the charge schedule for the electric vehicle; and
establish, responsive to the indication, the charge schedule as confirmed.

6. The system of claim 1, comprising the data processing system to:
determine a change in at least one of the state of charge of the battery of the electric vehicle, the state of health of the battery of the electric vehicle, or the drive mode of the electric vehicle;
provide, to the server responsive to detection of the change, a second weight generated for the model using the data, wherein the server updates the regional model based on the second weight generated for the model;
receive, from the server, a third weight generated for the regional model; and
update the model with the third weight generated for the regional model.

7. The system of claim 1, comprising the data processing system to:
receive an input from the electric vehicle;
provide, to the server, a second weight generated for the model using the input from the electric vehicle, wherein the server updates the regional model based on the second weight generated for the model;
receive, from the server, a third weight generated for the regional model; and
update the model with the third weight generated for the regional model.

8. The system of claim 7, wherein the input from the electric vehicle includes at least one of an input to prioritize the state of charge of a battery of the electric vehicle, an input to prioritize the state of health of the battery of the electric vehicle, or an input to prioritize energy consumption.

9. The system of claim 1, wherein the charge schedule includes at least one of a time window for charging the battery, a time window for fast-charging the battery, a time window for warming the electric vehicle, a time window for cooling the electric vehicle, a time window for performing maintenance, or a time window for performing software updates.

10. The system of claim 1, comprising the data processing system to:

receive, via a user interface, an indication to override the charge schedule; and disable execution of the charge schedule responsive to the indication.

11. The system of claim 10, wherein the indication includes data comprising at least one of the state of charge of the battery of the electric vehicle, the state of health of the battery of the electric vehicle, or the drive mode of the electric vehicle.

12. The system of claim 10, comprising:

provide, to the server, a second weight generated for the model using the indication, wherein the server updates the regional model based on the second weight generated for the model;

receive, from the server, a third weight generated for the regional model; and update the model with the third weight generated for the regional model.

13. A method, comprising:

identifying, by a data processing system comprising one or more processors and memory, data comprising a state of charge of a battery of an electric vehicle, a state of health of the battery of the electric vehicle, and a drive mode of the electric vehicle;

receiving, by the data processing system, from a server, a weight generated for a regional model that includes charging characteristics of electric vehicles across a region;

generating, by the data processing system, based on input of the data and the weight into a model trained with machine learning, a charge schedule to charge the battery of the electric vehicle, wherein the charge schedule controls charging of the battery so that an amount of current from a power source varies over time;

facilitating, by the data processing system, responsive to the power source electrically coupled to the battery of the electric vehicle, charging of the battery of the electric vehicle in accordance with the charge schedule; and preventing, by the data processing system, conditioning of the battery in accordance with the charge scheduled.

14. The method of claim 13, comprising:

providing, by the data processing system, to the server, a second weight generated for the model using the data, wherein the server updates the regional model based on the second weight generated for the model;

receiving, by the data processing system, from the server, a third weight generated for the regional model;

updating, by the data processing system, the model with the third weight generated for the regional model; and establishing, by the data processing system, using the model updated with the third weight, a second charge schedule different from the charge schedule.

15. The method of claim 13, comprising:

executing, by the data processing system, the charge schedule to facilitate charging of the battery; and preventing, by the data processing system, responsive to execution of the charge schedule, current from being provided to the battery of the electric vehicle.

16. The method of claim 13, comprising:

determining, by the data processing system, a change in at least one of the state of charge of the battery of the electric vehicle, the state of health of the battery of the electric vehicle, or the drive mode of the electric vehicle;

providing, by the data processing system, responsive to detection of the change, to the server a second weight generated for the model using the data, wherein the server updates the regional model based on the second weight generated for the model;

receiving, by the data processing system, from the server, a third weight generated for the regional model; and updating, by the data processing system, the model with the third weight generated for the regional model.

17. An electric vehicle, comprising:

a battery; and one or more processors, in communication with the battery, to:

identify data comprising a state of charge of the battery, a state of health of the battery, and a drive mode of the electric vehicle;

receive, from a server, a weight generated for a regional model that includes charging characteristics of electric vehicles across a region;

generate, based on input of the data and the weight into a model trained with machine learning, a charge schedule to charge the battery of the electric vehicle, wherein the charge schedule controls charging of the battery so that an amount of current from a power source varies over time;

facilitate, responsive to the power source electrically coupled to the battery of the electric vehicle, charging of the battery of the electric vehicle in accordance with the charge schedule; and prevent conditioning of the battery in accordance with the charge schedule.

18. The electric vehicle of claim 17, comprising:

provide, to the server, a second weight generated for the model using the data, wherein the server updates the regional model based on the second weight generated for the model;

receive, from the server, a third weight generated for the regional model;

update the model with the third weight generated for the regional model; and establish, using the model updated with the second weight, a second charge schedule different from the charge schedule.

\* \* \* \* \*